United States Patent Office 3,423,060
Patented Jan. 21, 1969

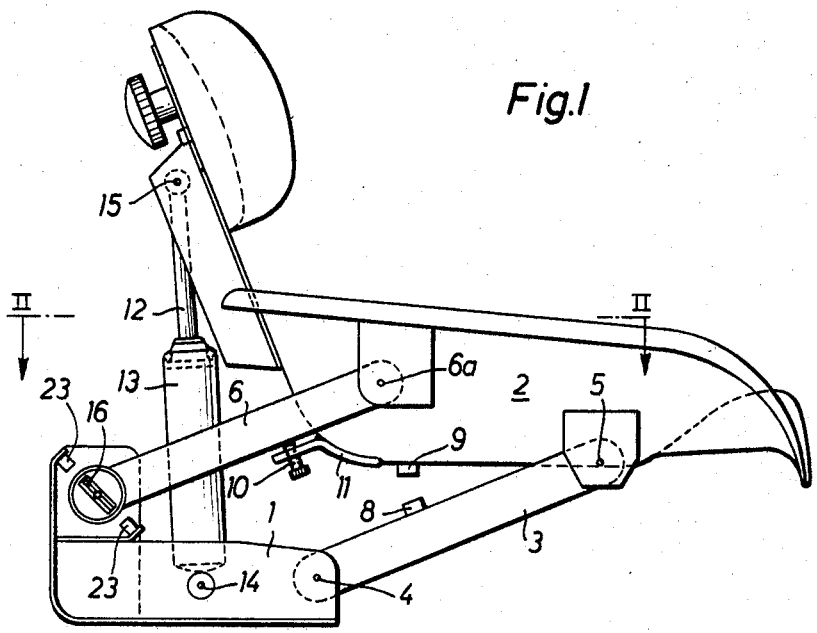
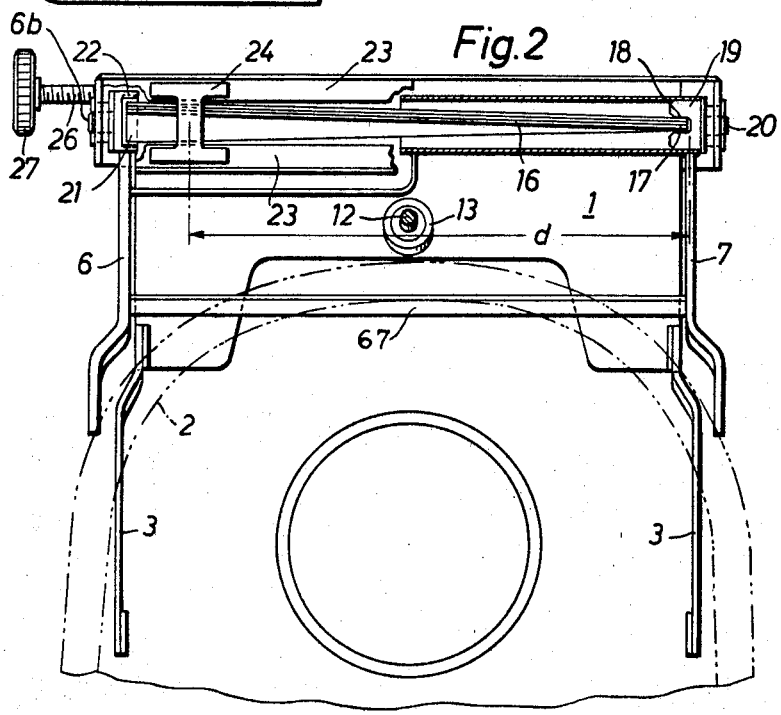

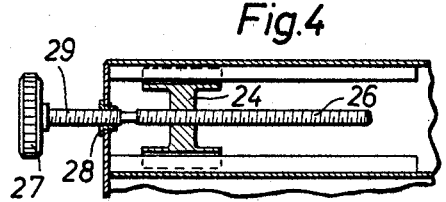
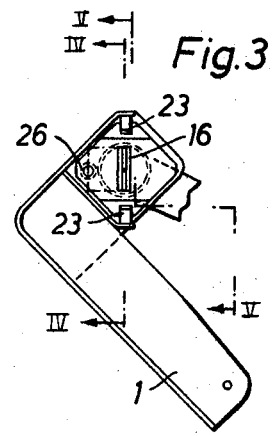
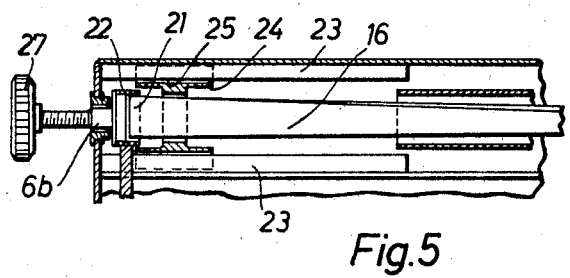
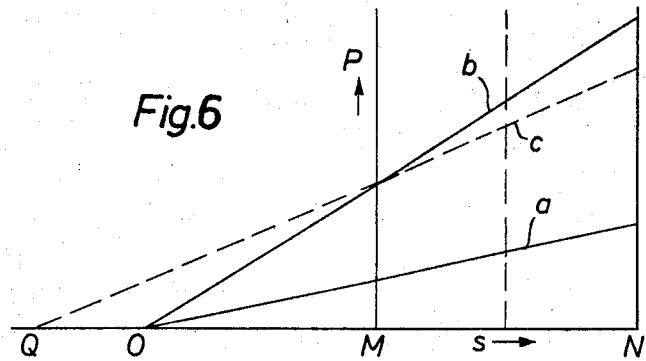

1

3,423,060
VEHICLE SEAT HAVING SPRING SUSPENSION
AND DAMPING
Wolfgang Fulling, Solingen-Ohligs, and Manfred Ambrosius, Langenfeld, Richrath, Germany, assignors to Bremshey & Co., Solingen-Ohligs, Germany, a corporation of Germany
Filed Dec. 20, 1966, Ser. No. 603,265
Claims priority, application Germany, Dec. 23, 1965,
B 85,111
U.S. Cl. 248—399    5 Claims
Int. Cl. B60n 1/02

ABSTRACT OF THE DISCLOSURE

Vehicle seat is provided with a prestressed torsion rod acting as a spring that has a cross-sectional shape other than a circular shape. A nonrotatable end of the length of the torsion rod that acts as a spring is mounted in a slide which is adjustable along the torsion rod. Adjustment of the slide along the torsion rod consequently furnishes a change in that length of the rod which acts as a spring and, inversely proportional therewith, a change in the spring constant thereof, i.e. in the angle about which the free end of the rod twists for a given torque.

---

Our invention relates to vehicle seat having spring suspension and damping.

A satisfactory adaptation of the seat springs on a vehicle requires varying the spring constant, i.e. the quotient of load to spring deflection. At its simplest, such a construction is attainable by adjusting the lever arm with which the spring directly or indirectly engages the movable seat support. Seats of this type, however, cannot be constructed as low as is actually necessary for vehicle seats generally.

Objects of our invention, accordingly, are to provide vehicle seat having spring suspension and damping which, departing from the heretofore known means of varying the effective leverage of the spring force, i.e. the transmission ratio thereof, has means for exerting an influence on the spring constant of the spring proper so as to thereby achieve an unusually simple construction and low seating level.

With the foregoing and other objects in view we provide, in accordance with our invention, vehicle seat having spring suspension and damping, wherein a prestressed torsion rod, acting as the spring, has a cross-sectional shape other than circular shape. A nonrotatable end of the length of the torsion rod acting as a spring is mounted in a slide which is adjustable along the torsion rod. Adjustment of the slide along the torsion rod consequently furnishes a change in that length of the rod which acts as a spring and, inversely proportional therewith, a change in the spring constant thereof, i.e., in the angle about which the free end of the rod twists for a given torque. It is consequently unnecessary to exercise any influence or control over the transmission ratio between the movable seat support and the spring by means of any intermediate rods.

The torsion rod, whose effective spring length is variable, not only offers the possibility of varying the spring constant, but also of controlling the location of the characteristic curve of the spring within the range of the spring action provided for the seat. This is brought about by twisting, from the start, the load-relieved torsion rod at least within the limits of the adjustment path of the slide. The term "load-relieved" should be considered in the sense that the rod is neither under the action of the load resting on the seat nor is prestressed, i.e. is in the condition before it was installed.

The features which are considered to be characteristic for the invention are set forth in the appended claims. Although the invention has been illustrated and described as embodied in vehicle seat having spring suspension and damping, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof, will be best understood from the following description of a specific embodiment when read in connection with the accompanying drawings, in which:

FIG. 1 is a side elevational view of a vehicle seat constructed in accordance with our invention;

FIG. 2 is a cross-sectional view of FIG. 1 taken along the lines II—II in the direction of the arrows;

FIG. 3 is another view of the base frame of the seat shown in FIG. 1, rotated about 45° clockwise, illustrating several additional features thereof;

FIG. 4 is a cross-sectional view of FIG. 3 taken along the line IV—IV in the direction of the arrows;

FIG. 5 is a cross-sectional view of FIG. 3 taken along the line V—V in the direction of the arrows; and FIG. 6 is a plot of the load P against the spring deflections illustrating characteristic spring curves.

Referring now to the drawings, and particularly to FIGS. 1 and 2 thereof, there is shown a seat having a base frame 1 on which the spring-mounted seat support 2 is movably mounted by means of two parallelogram linkages. In the illustrated embodiment, the seat support 2 is in the form of a mussel or shell such as is used especially for tractors. The seat is suitable, however, also for light trucks or those trucks which, for example, have narrow seating space in the driver's cab due to various reasons, and can be furnished with seating cushions and back-supports. Of the four linkages of the parallelogram, both of the lower linkages 3, which are connected by means of pins 4 and 5 to the base frame 1 and to the seat carrier 2 respectively, serve solely as guiding means and do not transmit any spring force. For increased rigidity, the linkages 3 can be connected to one another by a crosspiece (not shown), for example. The same is true for the one end of the upper linkage 6 which, as seen particularly in FIG. 2, is rotatably mounted by means of a pin 6b in the base frame 1, while a pin 6a, as shown in FIG. 1, articulatingly connects the linkage 6 to the seat support 2. The linkages 6 and 7 are rigidly connected to one another by means of a cross rod 67, as shown in FIG. 2, in order to render the spring action symmetrical, as is discussed further hereinbelow. The one linkage 3 and the linkage 6 are moreover provided with means for limiting the total lift of the seat. For this purpose, the linkage 3 carries a rubber bumper or cushion 8 which comes into engagement with a bumper 9 or a metal bracket located on the seat support 2 when the seat completely depresses the spring. The linkage 6 accordingly cooperates with the stop screw 10 which is mounted by means of a fitting 11 on the seat support 2 and provides an upper limit to the lift of the seat.

The seat 2 is, a usual, provided with vibration damping. For this purpose a damping element consisting of a piston 12 and cylinder 13 is provided and is connected by means of an articulated joint 14 to the base frame 1 and by means of an articulated joint 15 to the seat support 2.

The fourth linkage 7 (FIG. 2) forms the means for transmitting the spring force. To produce the spring force there is provided a torsion rod 16 having a rectangular cross section, which extends with the free end 17 thereof into a groove 18 of a bushing 19 which is firmly connected with the linkage 7 and is rotatably mounted by means of a pin 20 in the base frame 1. The opposite end 21 of the rod 16 extends freely rotatably into a bushing 22, which carries the pin 6b and is firmly connected to the linkage 6.

A slide 24 is displaceably but nonrotatably guided on two rails 23 which extend substantially parallel to the axis of the torsion rod 16. This slide 24 has a rectangular recess 25 (FIG. 5) formed therein which corresponds to the cross-sectional shape of the rod 16 and through which the rod 16 extends. The slide 24 can be adjusted along the rails 23 by means of a threaded spindle 26 (FIGS. 3 and 4) which is mounted parallel to and laterally offset from the torsion rod 16 in the base frame 1. The spindle 26 is provided on one outwardly extending end with a control knob and is mounted simply in a threaded bushing 28 (FIG. 4) in which a portion of the spindle 26 provided with a thread 29 is rotatable. The thread 29 obviously has a different and in some cases opposite pitch than the thread by which the slide 24 is displaced.

The slide 24 forms the rigid clamping locations of the torsion rod 16. The effective spring length of the rod is thus equal to the length $d$ which is shown in FIG. 2. It can be varied by suitably adjusting the slide 24. When assembling the seat, the rod is, from the start, placed in a specific prestressed condition, because it would otherwise be senseless to extend the spring deflection above the value corresponding to the smallest load and dynamic spring action contemplated.

In the diagram of FIG. 6, the load P is shown plotted against the spring deflection $s$. The practically negligible dead load consisting of the weight of the seat support 2 and the sprung portions connected therewith, is included in the value P. The spring deflection $s$ is measured in the diagram from the upper end position of the seat support, thus beginning in the diagram at the point M and consequently suppresses the spring deflection which must be traversed during assembly to produce the prestressing of the spring. It should first be assumed that the torsion rod 16 before assembly, when it is thus not subjected to any torque, is a pure prism. Two different positions of the slide 24 in the diagram according to FIG. 6, would then produce the two chacateristic curves $a$ and $b$. Characteristic curve $a$ corresponds to a setting or adjustment selected for a relatively light person and characteristic curve $b$ corresponds to an adjustment selected for a relatively heavy person. The slide 24 at the hand wheel or knob 27 is adjusted best under load by producing in the static condition a seating level which is approximately halfway between the points M and N, wherein the position M corresponds to the stopping engagement of the adjustment screw 10 with the linkage 6, and the position N corresponds to the stopping engagement of the bumpers 8 and 9. In this middle setting between the points M and N equal deflections are afforded for swinging the seat support 2 either upwardly or downwardly. For facilitating the adjustment, an indicator connected with the seat support can be provided at a suitable location (similar to that for a decimal balance) which cooperates with a stationary indicator and indicates the correct spring action by the coincidence thereof. A characteristic such as is illustrated in FIG. 6 by the curves $a$ and $b$ is not fully satisfactory, however, in all cases. On the contrary, it has been found that much more desirable spring ratios are achieved when the characteristic spring curves do not all intersect at a point as the curves $a$ and $b$ do at the point O. Thus, under certain conditions, more desirable spring ratios are obtained when a relatively high load corresponding to curve $c$ has a greater slope than the smaller load corresponding to the curve $a$, and does not, moreover, intersect the abscissa at the point O but rather at a point Q which, in the assumed example, is located to the left-hand side of the point O as shown in FIG. 6.

There are several reasons because of which the replacement of the line $b$ by a line $c$ of smaller slope is advantageous. Of these reasons only that condition is mentioned here that for establishing the spring value or constant, the location of the support at the foot of the spring must be taken into consideration. It is directly proportional to the weight of the body supported on the seat. The weight of the sprung seat material remains constant, however, both for a heavy as well as for lightweight persons. The lightweight person consequently becomes seemingly heavier. It is accordingly advantageous if the characteristic curve for this lightweight person is made more steeply than actually corresponds to the weight.

A characteristic modified in this manner can be realized through our invention by the additional feature that a somewhat twisted form is imparted from the very beginning to the torsion rod 16, contrary to the statement first made, so that the rod even before installation and in unloaded condition, is not in the form of a prism but rather in the form of a screw, stereometrically speaking. This could not be shown in the drawing because the installed rod is already prestressed and therefore in each case is twisted opposite to its original form.

Only for the sake of completeness and also in view of theoretical considerations, it should be noted that there would be a corresponding ideal spring suspension or cushioning if the amount of damping also were varied with the load applied. From a practical standpoint this is however usually of secondary importance. Since the friction in the linkages and guides also increases for an increasing load, an increase in the damping is produced with an increasing load anyway. In practice, moreover, it is only of little significance that the relatively slightly loaded seat swings very slowly or creepingly due to large damping whereas the relatively highly loaded seat, due to slight damping, responds with one or two overswings to a jolt, because the natural frequency of a given seat can be so selected that it lies in a range which is least injurious to the wellbeing of people who are to be seated thereon.

Finally, the significance of the firm connection between the linkages 6 and 7 should be emphasized because this feature permits the spring action to be introduced through both linkages uniformly to the seat support even though the torsion rod engages only one linkage. Moreover, the rod need not have a rectangular cross section. A rod having an elongated rounded cross section, such as oval, for example, would also moreover be feasible for the purpose of our invention.

We claim:

1. Vehicle seat comprising a base, a prestressed torsion rod mounted on said base, said torsion rod having an effective spring length with ends thereof respectively rotatable and nonrotatable relative to said base, a seat frame connected to the effective spring length of said torsion rod at a location thereof spaced from said nonrotatable end thereof so as to be spring-supported thereby, and a slide member mounted on said base and constrained against movement relative thereto except in a direction along said torsion rod, said slide member being adjustably movable along said torsion rod and being engageable with said torsion rod at varying locations thereof for constraining said torsion rod from rotation at the respective locations of engagement, said respective locations of engagement coinciding with said nonrotatable end of said effective spring length of said torsion rod, whereby the effective spring length of said torsion rod is adjustably varied.

2. Vehicle seat according to claim 1, wherein said torsion rod has a noncircular cross section, and said slide member has an opening therein having a cross section corresponding substantially to the noncircular cross section of said torsion rod, said nonrotatable end of the effective spring length of said torsion rod being received in said opening of said slide member.

3. Vehicle seat according to claim 2, including rail means fixed to said base and extending in the direction of said torsion rod alongside said rod, said slide member being slidably mounted on said rail means.

4. Vehicle seat according to claim 1, wherein said slide member is adjustably movable in a path between given limiting positions on said torsion rod, and said torsion rod is twisted at least between said given limiting positions in fully loaded condition of said seat frame.

5. Vehicle seat according to claim 1, including a parallelogram linkage supporting said seat frame, said torsion rod comprising one link arm of said parallelogram linkage, another link arm of said parallelogram linkage being engageable with said torsion rod respectively at each end thereof, said other link arms being firmly connected to one another.

References Cited

UNITED STATES PATENTS

| | | | |
|---|---|---|---|
| 3,031,164 | 4/1962 | Schopf | 248—373 |
| 3,109,621 | 11/1963 | Simons et al. | 248—399 |
| 3,338,543 | 8/1967 | Stuckenberger et al. | 248—399 |
| 3,345,106 | 10/1967 | Tschursch et al. | 297—308 |

JOHN PETO, *Primary Examiner.*

U.S. Cl. X.R.

248—373